UNITED STATES PATENT OFFICE.

TIMOTHY GUILFORD, OF NEW YORK, N. Y.

COMPOSITION FOR BUTTONS, &c.

SPECIFICATION forming part of Letters Patent No. 253,200, dated February 7, 1882.

Application filed November 12, 1881. (Specimens.)

*To all whom it may concern:*

Be it known that I, TIMOTHY GUILFORD, a citizen of the United States, residing in the city, county, and State of New York, have invented certain Improvements in Compositions for Buttons and other Articles, of which the following is a specification.

My invention relates to a material made by grinding or pulverizing horn or hoof, which is extensively used for making buttons and similar small articles. The ordinary method of using this material is to place it while slightly moist in heated dies and submit it therein to heat and pressure, which consolidates the mass and renders it homogeneous and very hard. Articles made from this substance in its normal state vary in color and opacity according to the purity of the materials employed, the purest and cleanest materials producing articles of a brown color and semi-transparent, and the more impure materials articles that are dark and nearly opaque.

It has heretofore, so far as I am aware, been found impossible to impart to ground horn and hoof bright and delicate colors, and especially to produce a good opaque white compound therefrom.

The object of my present invention is to produce, by admixture with the horn and hoof of another substance or substances, a suitable white compound that will not be chalky and will bear a high polish. This compound may be used by itself to produce opaque colorless articles, and it may be used as a base to receive the various coloring substances, whereby the most beautiful and delicate tints may be obtained.

In carrying out my invention I select the purest and cleanest horn or hoof, by preference, and grind it in the usual way. With this I mix pulverized steatite, talc, or soapstone, preferring that quality known as "French chalk." The proportion of the steatite used will depend somewhat upon the quality of the horn or hoof used and somewhat upon the judgment of the workman; but I find that from two to four ounces of the steatite to a pound of horn or hoof will produce excellent results. Less than two ounces of the steatite will hardly suffice to produce a white compound, but it may serve as a base for strong colors, and more than four ounces will be apt to produce a chalky compound and affect its toughness and its capability of receiving a high polish.

Chalk (carbonate of lime) and sulphate of baryta, either separately or compounded, may be mixed in small quantities with the white compound above described to replace a corresponding proportion of the steatite; but care should be taken not to use too much of them or either of them, or the compound will be injured. Neither of these substances can be employed altogether in lieu of the steatite with satisfactory results. I may, however, employ gypsum, (sulphate of lime,) either calcined or not, as an equivalent for the carbonate of lime and baryta, for mixing with the steatite; but I prefer the latter alone for the finer kinds of work.

With the above-described white compound as a base I am able to produce a great range of pure and delicate colors, preferring as pigments vermilion for red, ultramarine for blue, ultramarine-yellow and ultramarine-green for yellows and greens, and umber and sienna for browns. In mixing the white compound with the colors I use both the dry and wet processes—that is to say, I may rub the white compound, in powder, through a sieve with the dry color, or may mix the whole with water. I prefer the dry process with green and yellow and the wet process for red and blue. The depth of the color will depend upon the proportion of coloring-pigment employed, and this must be left to the taste and wishes of the operator. These pigments, when mixed with the horn and hoof only, lose their brilliancy and delicacy, the brown tint of the material serving to dull and injure them, even the brown suffering thereby in clearness of tint.

As before stated, I am fully aware that ground horn and hoof has long been used, both alone and mixed with coloring substances, and I make no broad claim to this. I am also aware that ground bone, ivory, and hoof have been mixed with alkaline silicates and chloride of calcium, and with cheese-curd and phosphate of lime. None of these compounds, however, can or do accomplish what I seek by my compound of horn and hoof with steatite— namely, a clear white base, to be used alone or to receive delicate colors.

Having thus described my invention, I claim—

1. The herein-described compound, comprising as its elements pulverized horn or hoof and steatite, substantially as and for the purposes set forth.

2. The combination, with a compound composed of pulverized horn or hoof and steatite, of a coloring-pigment, substantially as and for the purposes set forth.

In witness whereof I have hereunto signed my name in the presence of two subscribing witnesses.

T. GUILFORD.

Witnesses:
 HENRY CONNETT,
 ARTHUR C. FRASER.